United States Patent [19]

Haines

[11] Patent Number: 5,111,767
[45] Date of Patent: May 12, 1992

[54] BOAT HULLS

[76] Inventor: John S. Haines, P.O. Box 91, Goodna, Qld 4300, Australia

[21] Appl. No.: 529,083

[22] Filed: May 25, 1990

[30] Foreign Application Priority Data

May 26, 1989 [AU] Australia .............................. PJ4399

[51] Int. Cl.⁵ .............................................. B63B 1/32
[52] U.S. Cl. .................................... 114/288; 114/357; 440/69
[58] Field of Search .............................. 114/288–291, 114/56, 57; 440/68, 69, 70

[56] References Cited

U.S. PATENT DOCUMENTS

| | | | |
|---|---|---|---|
| 3,091,206 | 5/1963 | Cale | 114/289 |
| 4,231,314 | 11/1980 | Peters | 114/289 |
| 4,689,026 | 8/1987 | Small | 440/69 |

FOREIGN PATENT DOCUMENTS

72608/87  11/1987  Australia .
81168/87   5/1988  Australia .

*Primary Examiner*—Jesûs D. Sotelo
*Attorney, Agent, or Firm*—Panitch Schwarze Jacobs & Nadel

[57] ABSTRACT

A boat hull having an underside, a transom and a recess adjacent the transom extending at least partially a transverse dimension or width of the underside. There is also provided a transverse step defining a transverse boundary of the recess as well an internal hollow venting body or reservoir having at least a pair of access ports of restricted cross-sectional size compared with an enlarged cross-sectional area of the venting body. The venting body is in fluid communication with the recess and the hull exterior wherein during travel of the boat hull venting of a low pressure area adjacent the recess can take place without water gaining access to the hull interior in the event of hard turning or rerversing, the water being trapped in the hollow venting body or reservoir. Preferably, the venting body is elongate having a major dimension corresponding to the enlarged cross-sectional area which defines a longitudinal extent of the venting body and a minor dimension defining a transverse extent of the venting body.

13 Claims, 4 Drawing Sheets

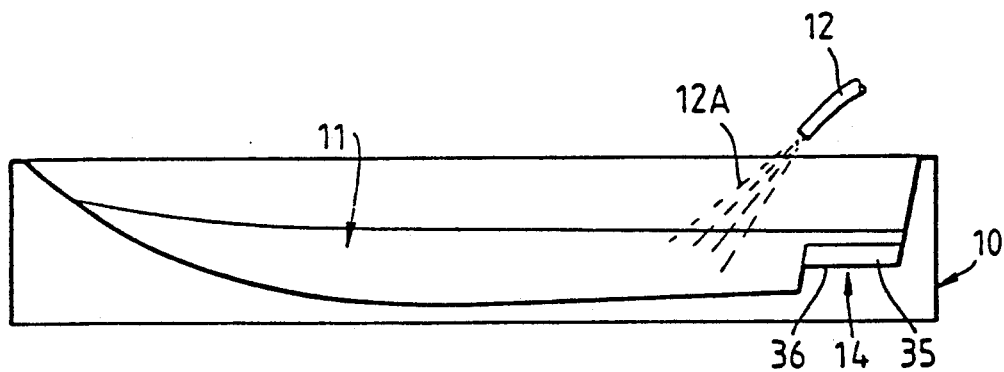
Fig.1.
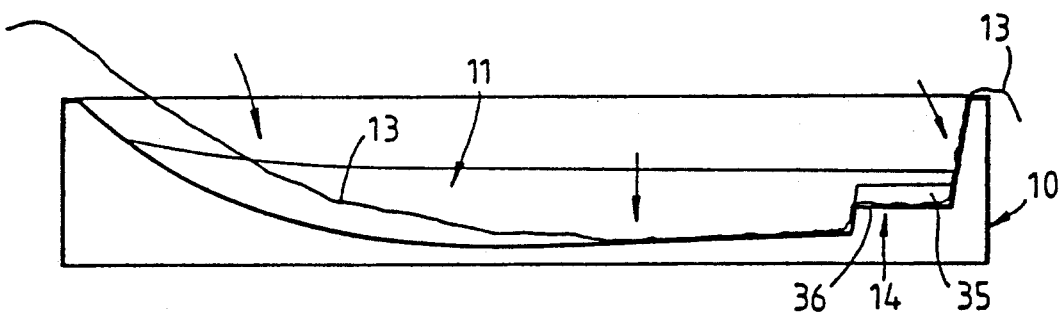
Fig.2.
Fig.11.
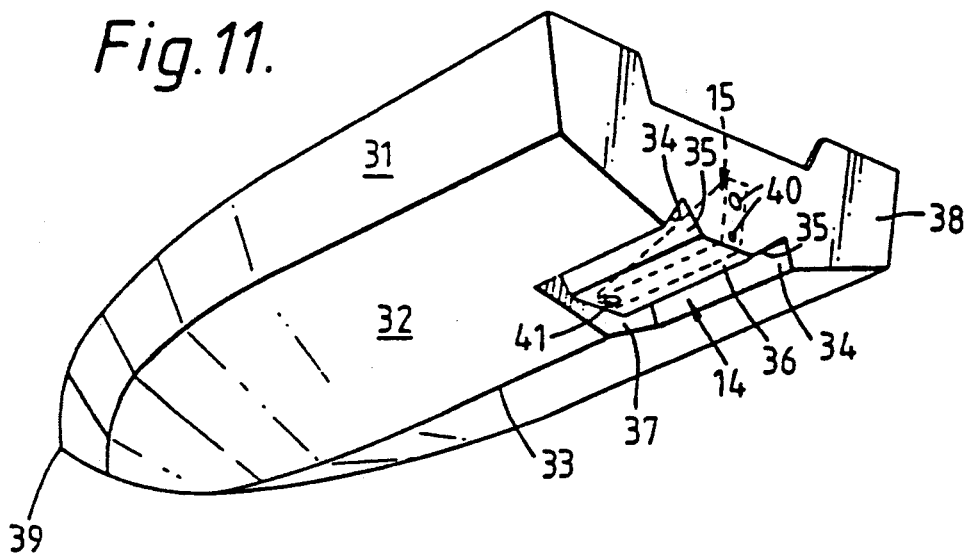

BOAT HULLS

This invention relates to an improved boat hull employing an improved venting means in combination with a transverse step.

Boat hulls of this type are known for example as described in Peters U.S. Pat. No. 4,231,314, Haines Australian Patent Specification 72608/87 and Cole U.S. Pat. No. 3,091,206. However each of these prior art references disclosed a transverse step extending the width of the hull underside in combination with an upright venting tube.

The provision of the transverse step adjacent the transom divided the hull underside into an elevated part adjoining the transom and a lowered part comprising the remainder of the hull underside. In this context the terms "elevated" or "lowered" had regard to a side elevation of the hull in an upright position.

The purpose of the venting tube as described in Australian Patent Specification 72608/87 was to facilitate the breaking of a seal or suction created by water flow when the boat hull was attempting to plane allowing the ingress of air to water located adjacent the transverse step and below the elevated part. In this arrangement the elevated part of the hull underside functioned as a reduced pressure area to reduce or avoid hull turbulence.

While the use of a venting tube which adopted an upright orientation was satisfactory in some respects one disadvantage was particularly relevant and this referred to water leakage into the hull interior particularly when the hull was reversing or turning hard. When the hull was reversing the transverse step became submerged and water pressure on the outside of the hull caused water to be forced up the venting tube and consequently it flooded the hull interior. When the boat hull was turning hard the hull leaned to one side because of its speed. This exposed the base open end of the venting tube with the consequential result that water was forced into the elevated part of the hull and forced up the venting tube.

The flooding or leakage of water into the hull interior as described above was disadvantageous because it provided discomfort to passengers and also adversely affected boat speed as well as planing efficiency.

It therefore is an object of the invention to provide a boat hull which may alleviate the aforementioned difficulties associated with the prior art.

The boat hull of the invention therefore has a hull underside, a transom, a recess adjacent the transom extending at least partially a transverse dimension or width of the hull underside, a transverse step defining a transverse boundary of the recess, an internal hollow venting body or reservoir having at least a pair of access ports of restricted cross sectional size compared with an enlarged cross sectional area of the venting body, said venting body being in fluid communication with the recess and a hull exterior wherein during travel of said boat hull venting of a low pressure area adjacent the recess can take place without water gaining access to the hull interior in the event of hard turning or reversing, said water being trapped in said hollow venting body or reservoir.

The transom recess is located adjacent the transom and suitably extends only partially the width of the hull underside to therefore provide a pair of adjacent planar hull underside sections which may merge with sidewalls or chines of the hull. However, this does not preclude the possibility of the transom recess extending the full width of the hull underside to merge with adjacent sidewalls or chines of the hull. Preferably the transom recess is substantially rectangular and thus may have a pair of opposed side walls, a top wall and an end wall oppositely located to an open front of the transom recess.

However, this shape is not essential and other suitable profiles (e.g. round or polygonal) may be utilized.

Preferably the venting body is elongate and has a major dimension defining a longitudinal extent of the venting body which may correspond to said enlarged cross sectional area and a minor dimension defining a transverse extent of the venting body. Preferably the major dimension extends substantially the length of the recess. Preferably the minor dimension is substantially constant throughout the longitudinal extent or length of the venting body as shown in the drawings hereinafter.

The venting body has at least a pair of access ports. Each of the access ports may be in the form of an access tube or conduit extending from the venting body to the hull exterior or the recess. More preferably however the access conduits may be dispensed with and one of the access ports in their preferred form may comprise an access aperture located in a suitable wall of the recess (e.g. preferably the top wall, but this is not essential and a side wall may be used if appropriate). The other access port may be in the form of an access aperture located in the hull exterior. In another variation each of the access ports may comprise a plurality of access conduits or branches leading from the venting body to the recess or hull exterior.

Thus, from the foregoing, when the communicating boat hull is travelling the recess is provided with a means by which wind or moving air from the hull exterior may gain access to the recess to facilitate the breaking of a seal or suction provided by water flow when the boat hull is attempting to plane.

In a preferred embodiment of the present invention the venting body may be mounted in the boat hull during manufacture thereof. The venting body in this embodiment may have a pair of opposed walls and mounting flanges which may be used in regard to mounting or location of the venting body adjacent the transom.

However, it will be appreciated that the venting body may be of any suitable shape, e.g. cylindrical, cuboidal or even irregular in shape if desired.

The venting body therefore suitably functions as a storage body or reservoir for water which may flow through either one of the access ports and thus suitably the venting body may be provided with draining means (e.g. a drain plug) for draining of the excess water when required.

In another aspect of the invention, the venting body may be used to vent the recess from any suitable hull location which is subject to relatively high pressure during travel of the hull. This may include areas adjacent the gunnel or adjacent the bow or through the deck of the hull or through the outboard wall. Thus, while the transom is one suitable venting location, it is not essential having regard to this aspect of the invention that the transom be used as the only venting location or sole venting location.

Suitably the hull when being manufactured is produced in two separate modules—a deck module and a body module. The body module may also include an elevated portion adjacent the transom which corresponds to the transom recess and the venting body may be mounted on the elevated portion. Suitably the transom is provided with a cut out or retaining slot so as to retain a transom end of the venting body.

After the venting body is moulded into place by application of suitable fibreglass medium holes may then be drilled so as to form the aforesaid transom open end and recess open end.

Reference may now be made to a preferred embodiment of the invention as shown in the attached drawings wherein:

FIGS. 1-4 show the early stages of manufacture of a boat hull in accordance with the invention;

FIGS. 11, 12 and 13 show a fragmentary rear perspective, bottom perspective and top plan view of a boat hull in accordance with the invention.

Figure 3:
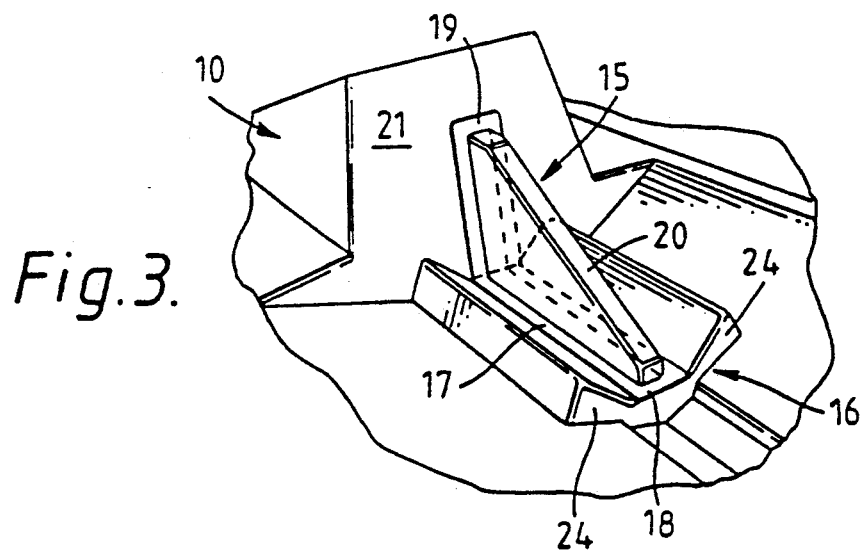

In the drawings and in particular in FIG. 1 there is shown a mould 10 in section for use in manufacture of boat hull 11 in accordance with the invention. Initially mould 10 is coated with release agent or wax 12A by use of spraying apparatus 12. Then laminate comprising one or a mixture of chopped rovings, chopped strand mat or woven rovings or cloth 13 or other suitable fibreglass components is applied to hull 11 as shown in FIG. 2.

Initially, the hull 11 has a shape which is designed in accordance with a design concept represented by suitable drawings and to that end includes recess 14.

Figure 4:
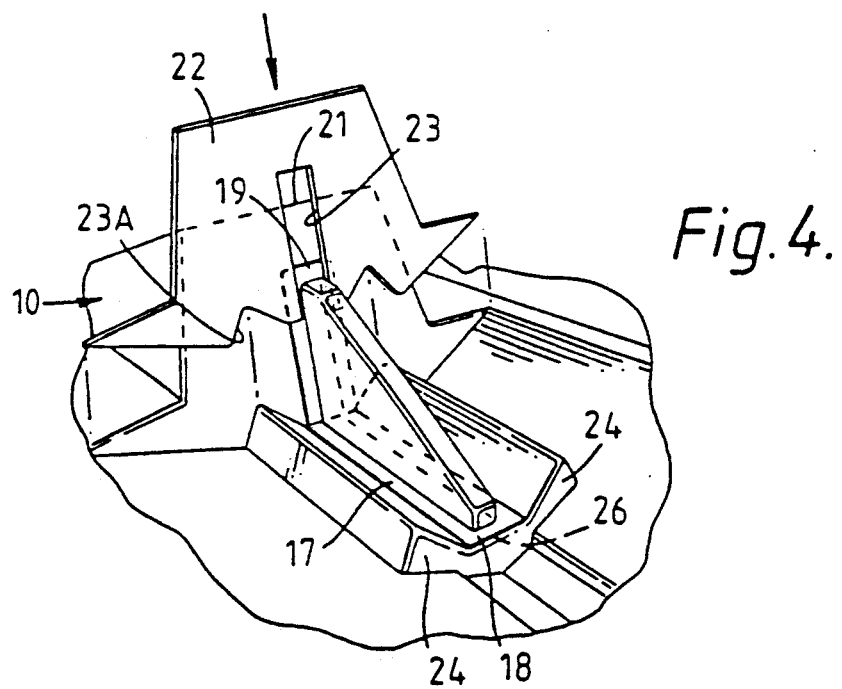
Figure 5:
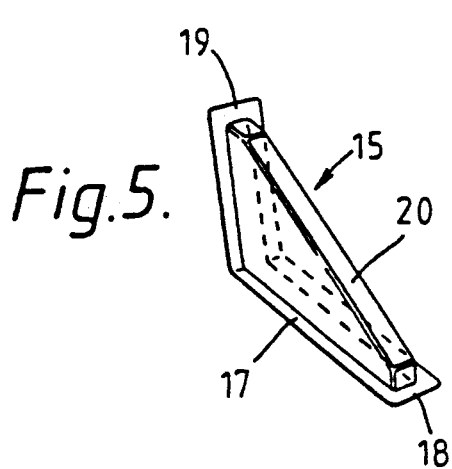
FIGS. 5-6 show differing perspective views of a venting body for use in the boat hull of the invention.
Figure 6:
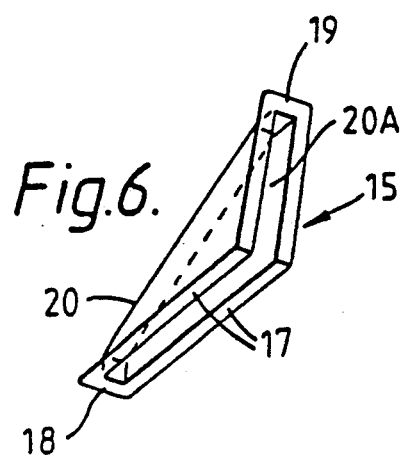
Figure 7:
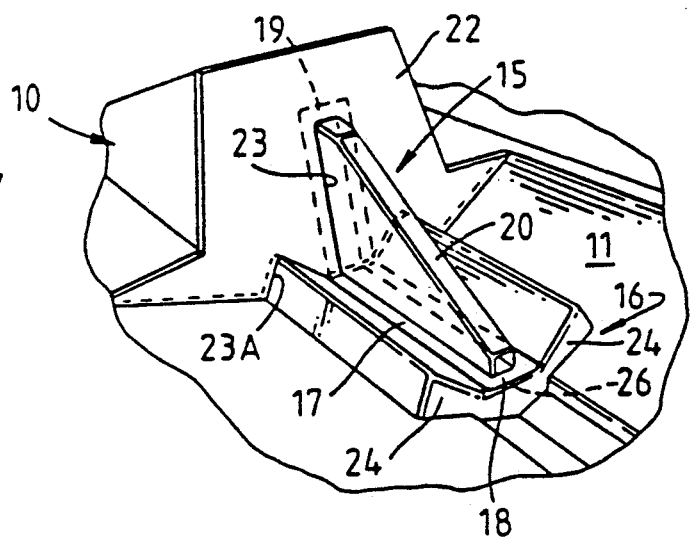
FIGS. 7-10 show latter stages of manufacture of a boat hull in accordance with the invention.

In FIGS. 3-4 there is shown the application of a venting body 15 which is mounted on raised portion 16 of hull 11 which defines recess 14. Venting body 15 is more particularly shown in FIGS. 5-6. Venting body 15 includes opposed walls 17 and base support flange 18 and vertical support flange 19. There is also shown end wall 20 as well as open part 20A.

Initially venting body 15 is mounted on raised portion 16 with support flange 19 bearing against end wall 21 of mould 10. Then as shown in FIG. 4 a transom board 22 is located adjacent wall 21 and straddling venting body 15. To this end transom board 22 is provided with cut out or retaining slot 23 which engages with venting body 15 as shown which is located in desired position by flange 19. The transom board 22 may also be provided with cut outs 23A for alignment with side ridges 24 of raised portion 16. Venting body 15 is supported on planar part 26 of raised portion 16.

Figure 8:
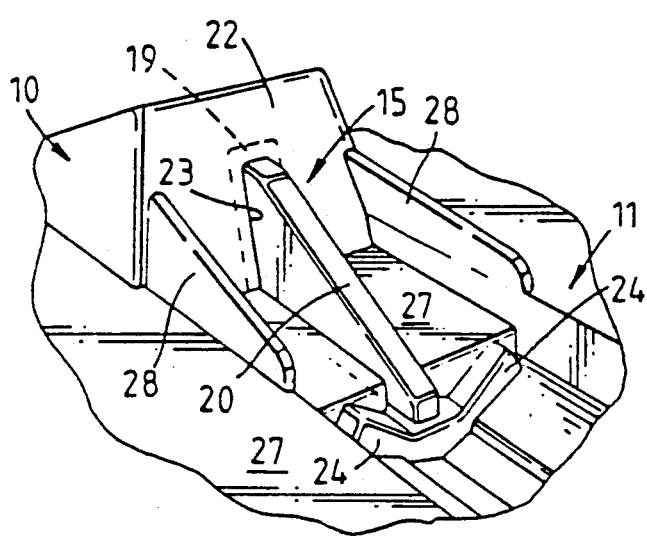

Subsequently, as shown in FIG. 8 a floor 27 or further coat of fibreglass components as already described above is applied to the transom board 22 and venting body 15 to retain these members in place in hull 11. Also utilized are reinforcing members or longitudinal stringers 28.

Figure 9:
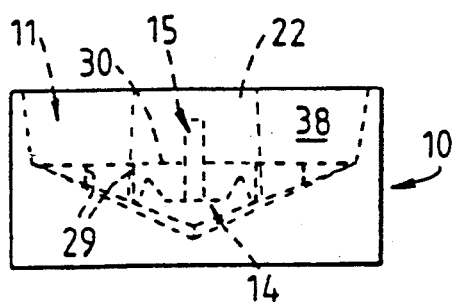
Figure 10:
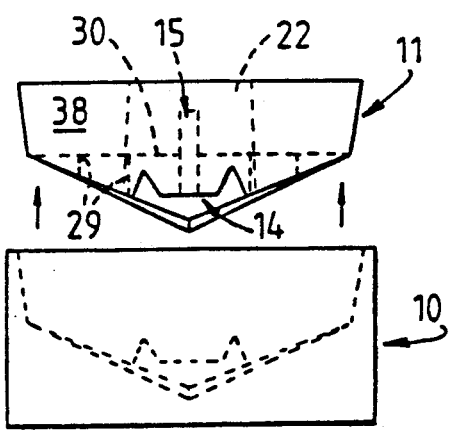

Finally, as shown in FIGS. 9-10 the completed boat hull 11 may be lifted out of mould 10 by a suitable gantry or overhead crane (not shown). There is also shown in FIG. 9 an arrangement of longitudinal stringers 29 and transverse reinforcement members or bulkheads 30. This is also shown in FIG. 13.

Figure 12:
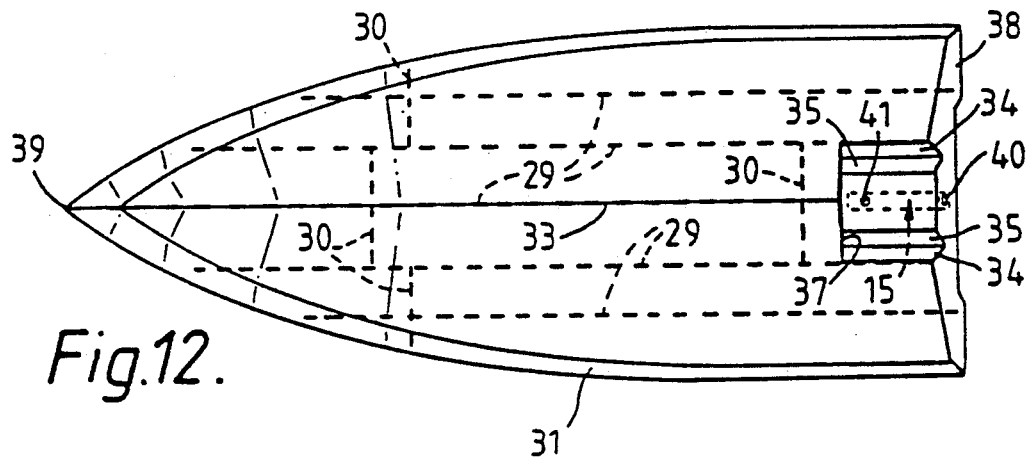
Figure 13:
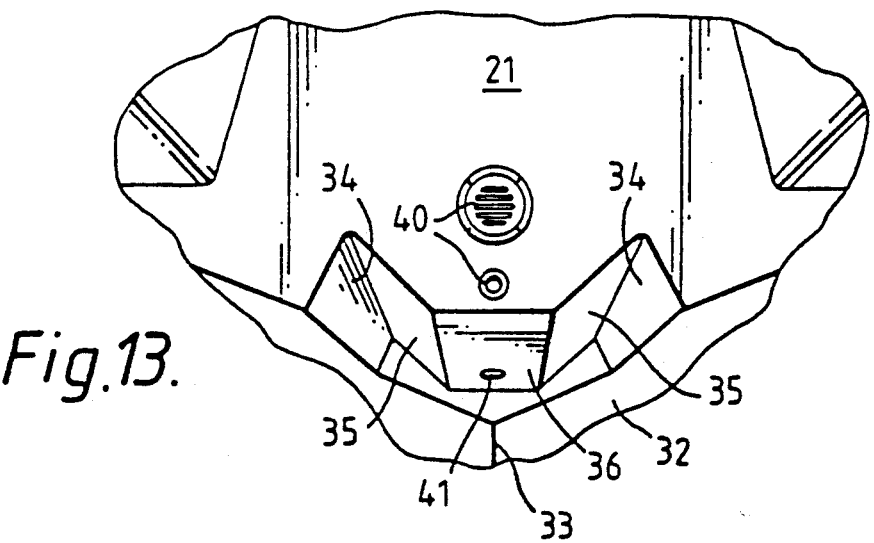

The complete boat hull 11 is shown in FIGS. 12-13 and includes gunnels 31, hull underside 32, keel 33, recess 14 having opposed side walls 34, intermediate surfaces 35 and central wall 36, end wall 37, transom 38, bow 39, venting body 15 shown in phantom and including transom open end or access port 40 and recess open end or access port 41.

In FIG. 13 there is also shown a more detailed view of recess 14 including drain hole 40 for venting body 15.

It will also be appreciated from the foregoing discussion that some variation may be made in regard to the abovementioned steps utilized in relation to manufacture of boat hull 11.

Thus transom board 22 may be interposed between mould wall 21 and venting body 15 at any suitable time and to this end may not necessarily possess a cut out 23. In this variation the flange 19 may be located in bearing relationship with transom board 22 and be retained in this position upon application of floor 27 which also covers open top of venting body 15 as shown in FIG. 8.

The invention from the foregoing may also cover a process for manufacture of a boat hull including a transom including the steps of:

(i) supporting a hollow venting body adjacent the transom;
(ii) forming a recess in the hull underside adjacent the transom;
(iii) forming an access port in the recess so that the hollow venting body is in fluid communicating with the recess;
(iv) forming an access port in the hull exterior so that the venting body is in fluid communication with the hull exterior.

Obviously steps (i), (ii), (iii) and (iv) are interchangeable and suitably during formation of the recess there is provided a raised portion in the hull interior adjacent the transom which may be used for mounting or location of the hollow venting body.

Thus it therefore will be appreciated from the foregoing that the provisions of a hollow venting body having fluid communication with the transom as well as the recess means that venting of the low pressure area defined by the recess can now take place without water gaining access to the boat interior in the event of hard turning or reversing. Excess water can be stored in the venting body and this can be drained at any suitable time, e.g. when the boat is moored after return from a trip or excursion.

It will be appreciated that the provision of the venting body is also useful in providing a structural reinforcement for boat hull 11 particularly in the region of the transom and this feature is assisted by the provision of stringers 28. The venting body may also be useful as a baffle.

There also may be utilized a deck module (not shown) which is fitted to boat hull 11 during manufacture after the application of floor 27. This therefore provides the boat hull 11 in final manufactured form.

THE CLAIMS DEFINING THE INVENTION ARE AS FOLLOWS:

I claim:

1. A boat hull comprises an underside, a transom, a recess not containing a propeller adjacent the transom being extending at least partially a transverse dimension along the hull underside, a transverse step defining a transverse boundary of the recess, a hollow venting body within the hull, the venting body having at least a pair of access ports which are of restricted cross sectional size compared with an enlarged cross sectional area of the venting body, with one access port communicating to the hull exterior and another access port communicating with the recess through a wall of the recess, whereby during travel of the boat hull, venting of a low pressure area adjacent the recess can take place and, in the event of hard turning or reversing, water is precluded from gaining access to the boat hull interior other than in the venting body.

2. A boat hull as claimed in claim 1 wherein the venting body is elongated having a major dimension corresponding to said enlarged cross sectional area defining a longitudinal extent of the venting body and a minor dimension defining a transverse extent of the venting body.

3. A boat hull as claimed in claim 2 wherein the major dimension extends substantially the length of said recess.

4. A boat hull as claimed in claim 2 wherein the minor dimension of said venting body is substantially constant throughout its longitudinal extent.

5. A boat hull as claimed in claim 2 wherein the major dimension of the venting body is oriented in a direction substantially coinciding with a longitudinal axis of the hull.

6. A boat hull as claimed in claim 1 wherein the hollow venting body is also in fluid communication with the transom.

7. A boat hull as claimed in claim 1 wherein said venting body is provided with drainage means to facilitate drainage of water therefrom.

8. A boat hull as claimed in claim 1 wherein the venting body is an integral component of the hull interior, with one end of the venting body being located adjacent the transom.

9. A boat hull as claimed in claim 1, wherein said at least a pair of access ports are of restricted cross sectional size compared with a transverse cross sectional area of the venting body.

10. A method of manufacture of a boat hull including a transom including the steps of:
(i) supporting a hollow venting body within the hull adjacent the transom;
(ii) forming a recess in the hull underside adjacent the transom;
(iii) forming a first access port of restricted cross sectional size as compared with an enlarged cross sectional area of the venting body in the recess so that the hollow venting body is in fluid communication with a wall of the recess;
(iv) forming a second access port in the hull exterior so that the venting body is in fluid communication with the hull exterior.

11. A method as claimed in claim 10 wherein the venting body is formed as an integral component of the interior of the hull with one end of the venting body being located adjacent the transom.

12. A boat hull having a hull underside, a transom, a recess adjacent the transom extending at least partially a transverse dimension along the hull underside, a transverse step defining a transverse boundary of the recess, a hollow venting body within the hull, the venting body having at least a pair of access ports which are of restricted cross sectional size compared with an enlarged cross sectional area of the venting body, with one access port located in the transom communicating to the hull exterior and another access port communicating with the recess through a top wall of the recess, whereby during travel of the boat hull, venting of a low pressure area adjacent the recess can take place and in the event of hard turning or reversing, water is precluded from gaining access to the boat hull interior other than in the venting body.

13. A boat hull having a hull underside, transom, a recess adjacent the transom extending at least partially a transverse dimension along the hull underside, a transverse step defining a transverse boundary of the recess, a hollow venting body within the hull, the venting body having at least a pair of access ports which are of restricted cross sectional size compared with an enlarged cross sectional area of the venting body with one access port located in the transom communicating to the hull exterior and another access port communicating with the recess through a wall of the recess, whereby during travel of the boat hull, venting of a low pressure area adjacent the recess can take place.

* * * * *